_United States Patent_ [19]

Cherukuri et al.

[11] 4,352,822

[45] Oct. 5, 1982

[54] GUM BASE, CHEWING GUM CONTAINING SAME AND METHOD

[75] Inventors: Subraman R. Cherukuri; Dominick R. Friello, both of Danbury, Conn.; Michael Ferroti, Larchmont; Walter Jewell, Mamaroneck; Ronald P. D'Amelia, Hicksville, all of N.Y.

[73] Assignee: Nabisco Brands Inc., New York, N.Y.

[21] Appl. No.: 216,415

[22] Filed: Dec. 15, 1980

[51] Int. Cl.$^3$ ............................................... A23G 3/30
[52] U.S. Cl. ............................................. 426/4; 426/3; 426/6
[58] Field of Search .................................. 426/3, 4, 6

[56] References Cited

U.S. PATENT DOCUMENTS

| | | | |
|---|---|---|---|
| 3,063,844 | 11/1962 | Meguro et al. | 426/6 |
| 3,285,750 | 11/1966 | Ishida | 426/6 |
| 3,984,574 | 10/1976 | Comollo | 426/4 |
| 4,187,320 | 2/1980 | Koch | 426/3 |
| 4,202,906 | 5/1980 | Ogawa et al. | 426/3 |
| 4,241,091 | 12/1980 | Stroz et al. | 426/4 |

_Primary Examiner_—Jeanette M. Hunter
_Attorney, Agent, or Firm_—Richard Kornutik

[57] ABSTRACT

A synthetic non-styrene-butadiene rubber gum base is provided which has non-stick properties, retains its softness over extended periods of time even without the presence of antioxidants and improves or extends sweetness and flavor when used in either sugar or sugarless chewing gums and contains polyisobutylene and a mixture of polyvinyl acetate, triacetin and glyceryl monostearate as film forming-plasticizing agents together with polyterpene, polyethylene, wax, glyceryl monostearate, fatty acid esters and filler. A chewing gum containing this gum base and method for preparing same are also provided.

25 Claims, No Drawings

GUM BASE, CHEWING GUM CONTAINING SAME AND METHOD

FIELD OF THE INVENTION

The present invention relates to a non-stick non-styrene-butadiene rubber (non-SBR) gum base, to chewing gum containing such gum base and to a method for preparing same.

BACKGROUND OF THE INVENTION

Chewing gums available today generally contain a natural rubber gum base, a synthetic rubber gum base or a mixture of natural and synthetic rubber gum bases. In the case of synthetic rubber gum bases, the elastomer usually employed is styrene-butadiene copolymer. However, due, in part, to the relatively high cost of styrene-butadiene copolymer, polyisobutylene has been used in place of or in addition to this elastomer as disclosed in U.S. Pat. No. 3,984,574 to Comollo. This patent discloses a non-tack chewing gum which contains as the preferred elastomer a low molecular weight polyisobutylene (molecular weight of 6,000 to 12,000), and/or a higher molecular weight polyisobutylene (molecular weight of 40,000 to 120,000); it is also indicated that other elastomers may be employed in place of or together with the polyisobutylene, namely, polyisoprene, a copolymer of isobutylene and isoprene, or the copolymer of butadiene and styrene. Comollo indicates in Column 4, starting at line 25, that chewing gum bases of his invention are non-adhesive or abhesive and to maintain this non-adhesive property "Natural gums are not combined with natural resins and rosin derivatives, and resins or waxes of petroleum origin. Natural gums are also not combined with natural or synthetic rubbers and resins such as rosin derivatives, PVA and polyterpenes. In addition, natural gums are not combined with natural or synthetic rubbers and waxes of petroleum or natural origin. Finally, natural or synthetic rubbers are not combined with waxes and resins." The Comollo chewing gum also contains hydrogenated vegetable oils or animal fats, mineral adjuvants, such as calcium carbonate, talc or tricalcium phosphate, polyvinyl acetate having a molecular weight of at least 2,000, and fatty acids, such as stearic and palmitic acid, and mono and diglycerides of fatty acids.

DESCRIPTION OF THE INVENTION

In accordance with the present invention, a non-styrene-butadiene rubber (SBR) gum base is provided which contains a unique combination of plasticizers and waxes and has the unique properties of improving or extending sweetness and/or flavor in both sugar and sugarless chewing gums, retaining its softness over extended periods of time even without the presence of antioxidants and in preferred embodiments is non-sticky even though waxes are present. These outstanding features are attained by employing as the elastomer in the gum base of the invention a mixture of polyisobutylene of medium molecular weight (750,000 to 1,300,000 [Flory]), and lower molecular weight (37,000 to 80,000 [Flory]) together with a unique combination of plasticizers including acetylated mono and triglycerides such as glyceryl monoacetate, and glyceryl triacetate together with a hydrophilic type detackifier, such as polyvinyl acetate and a combination of ingredients to impart non-stick properties which include polyterpene resin (which also serves as a film-former to aid in blowing bubbles), one or more hard waxes to enhance slip and bite through characteristics and optionally polyethylene wax to impart non-tack properties. In addition, the unique gum base of the invention will contain an emulsifier, such as glyceryl monostearate, optionally hydrogenated or partially hydrogenated fatty acid esters of vegetable or animal origin to impart softening and plasticity, and one or more fillers-texturizing agents.

The gum base of the invention and chewing gum containing same have been found to have excellent shelf-life even without the presence of antioxidants. All of the ingredients of the gum base have good stability so that the gum base and chewing gum containing same have a shelf-life, in most cases, as good as that of gum base and chewing gum containing antioxidants.

In addition, the ingredients of the gum base of the invention have little or no calorie content so that the gum base may be employed in a low or no calorie chewing gum product.

In forming the gum base of the invention, the mixture of polyisobutylene elastomers will be present in an amount within the range of from about 0.5 to about 25% and preferably from about 4 to about 16% by weight of the gum base, with the medium molecular weight (750,000 to 1,300,000) polyisobutylene being employed in a weight ratio to the lower molecular weight (37,000 to 80,000) polyisobutylene of within the range of from about 1:1 to about 1:10, and preferably from about 1:1 to about 1:6. The presence of both the medium and lower molecular weight polyisobutylenes are preferred to provide cohesiveness, resistance to oxidation and good bubble blowing; the medium molecular weight polyisobutylene itself provides a good bubble blowing film.

The mixture of glyceryl triacetate and glyceryl monoacetate plasticizers are essential to the gum base of the invention for imparting softness and plasticization to the gum base. The glyceryl triacetate will be present in an amount of within the range of from about 0 to about 10%, and preferably from about 1 to about 8% by weight of the gum base, while the acetylated monoglyceride will be present in an amount of within the range of from about 0 to about 15%, and preferably from about 1 to about 10% by weight of the gum base.

The hydrophilic-type detackifier will sorb saliva and become slippery and is incompatible with the elastomer and solvent for the elastomer. Examples of such materials suitable for use herein will include vinyl polymers having a molecular weight of at least 2,000, and preferably within the range of from about 2,000 to about 10,000 or more, such as polyvinyl acetate, polyvinyl butyl ester and copolymers of vinyl esters and vinyl ethers. The hydrophilic-type detackifier will be employed in an amount ranging from about 5% to about 60%, preferably from about 10 to about 45% and optimally from about 15 to about 30% by weight of the gum base.

The optional softening-plasticizing agent which may be employed herein comprises one or more hydrogenated vegetable or animal fats having a high melting point, that is, above about 22° C. and preferably above about 50° C., and will be employed in amounts ranging from about 0.5 to about 25% by weight of the gum base, preferably from about 2 to about 18%, and optimally from about 7 to about 12%. Examples of such fatty material useful herein include hydrogenated soyabean oil (or flakes), cottonseed oil, corn oil, peanut oil, cocoa butter, and palm oil, as well as animal fats, such as tallow or lard; preferred is a mixture of from about 2 to about 10%, and preferably from about 3 to about 8% by weight hydrogenated soyabean oil and from about 2 to about 15%, and preferably from about 4 to about 10% by weight cottonseed oil flakes and/or cocoa butter, based on the weight of the gum base.

The emulsifier will impart hydrophilic properties to the gum base so that saliva will be absorbed thereby making the gum base slippery and will be employed in amounts ranging from about 0.1 to about 10% by weight of the gum base, preferably from about 4 to about 7%, and optimally from about 5 to about 7%. Examples of such emulsifiers include glyceryl monostearate, phosphatides, such as lecithin and cephalin, Tweens, Spans, and mixtures thereof. Preferred is glyceryl monostearate.

Where it is desired to impart non-tack or non-stick properties to the gum base, the gum base will preferably include a polyethylene wax having a melting point of at least 170° F. and preferably from about 170° to about 300° F. employed in amounts of from about 0.25 to about 5%, and preferably from about 1 to about 4% by weight of the gum base.

The waxes suitable for use in the gum base composition serve as slip agents or lubricants and enhance bite through and should have a melting point of above about 35° C. and preferably above about 70° C. Examples of such waxes include candelilla wax, paraffin wax, carnauba wax, ozokerite, oricury, microcrystalline wax and the like. The waxes will be employed in an amount within the range of from about 2 to about 25% by weight of the gum base, preferably from about 6 to about 18%, and optimally from about 8 to about 15% by weight. The preferred waxes and microcrystalline wax and paraffin wax, preferably employed in combination so that from about 0 to about 15% (based on the weight of the gum base) of the microcrystalline wax is employed with from about 0 to about 15% (based on the weight of the gum base) of the paraffin wax. The waxes are found to reduce the tackiness of the final gum composition without significantly reducing cohesivity thereof and also improve bite through and soft chew of the final gum product.

The polyterpene resin, which functions as a tackifier-film former and plasticizer for polyisobutylene and aids in blowing bubbles and increasing film thickness, will be present in an amount within the range of from about 0 to about 25%, and preferably from about 4 to about 20% by weight of the gum base.

Other anti-tack agents may be employed in place of or together with the polyethylene wax, such as titanium dioxide in amounts of from about 0.3 to about 1% by weight of the gum base as disclosed in U.S. Pat. No. 3,974,293, gelatin-tannic acid as disclosed in U.S. Pat. No. 3,255,018 or other conventional anti-tack agents.

The filler-texturizing agent is employed to adjust the texture of the gum to impart good lubricant and flavor release properties and will be employed in amounts ranging from about 0 to about 60% by weight of the gum base composition, preferably from about 15 to about 45% by weight, and optimally from about 20 to about 30% by weight. Examples of such texturizing agents suitable for use herein include ground limestone (calcium carbonate), talc, hydrated aluminum oxide, and magnesium trisilicate, with calcium carbonate being preferred.

As indicated, the gum base of the invention as described above will be employed in conjunction with other chewing gum ingredients to form the chewing gum composition of the invention.

The chewing gum composition of the invention will include from about 10 to about 40%, and preferably from about 15 to about 30% by weight of the unique gum base described above and will also include from about 75 to about 65%, and preferably from about 72 to about 68% by weight of a soluble phase which includes one or more sweeteners, flavoring materials, coloring agents, wetting agents and the like.

The soluble phase and/or the gum base of the chewing gum composition of the invention may include one or more natural sweeteners present in an amount ranging from about 0.05 to about 90% by weight, preferably from about 40 to about 90% by weight, and more preferably from about 55 to about 85% by weight of the final chewing gum product. Such sweeteners may include one or more sugars or sugar-containing material, for example, monosaccharides, disaccharides, and polysaccharides, and polyols, some examples of which follow.

A. Monosaccharides of 5 or 6 carbon atoms—arabinose, xylose, ribose, glucose, mannose, galactose, fructose, or sorbose or mixtures of two or more of the foregoing monosaccharides.

B. Disaccharides—sucrose, such as cane or beet sugar, lactose, maltose or cellobiose.

C. Polysaccharides—partially hydrolyzed starch, dextrin or corn syrup solids.

D. Polyols—sorbitol, mannitol, xylitol or arabitol, as well as hydrogenated starch hydrolysate.

Included within the above sweeteners are liquid moisturizers, such as corn syrup, fructose syrup, hydrogenated starch hydrolysate syrup, sorbitol syrup, sugar syrup and the like.

Furthermore, artificial sweeteners may be employed in amounts of up to 1 to 2% by weight of the chewing gum. Examples of such sweeteners include poorly water-soluble as well as water-soluble forms, such as the free acid form of saccharin, sodium saccharin, calcium saccharin, dihydrochalcones, glycyrrhizin, glycyrrhizic acid ammonium salt, L-aspartyl-L-phenyl-alanine methyl ester, as well as *Stevia rebaudiana* (Stevioside), *Richardella dulcifica* (Miracle Berry), *Dioscoreophyllum cumminsii* (Serendipity Berry), cyclamates, and the like, or mixtures of any two or more of the above.

The soluble phase and/or the gum base will also include a flavoring in an amount ranging from about 0.3 to about 1.5% by weight and preferably from about 0.8 to about 1.2% by weight of the final chewing gum product. The flavoring may comprise oils derived from plants, leaves, flowers, etc. Representative flavor oils of this type include essential oils, such as peppermint oil, spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen), and also include citrus oils, such as lemon oil, orange oil, lime oil, grapefruit oil, fruit essences, such as apple essence, pear essence, peach essence, strawberry essence, apricot essence, raspberry essence, cherry essence, plum essence, pineapple essence and the like. Various synthetic fruit flavors, such as mixed fruit may also be incorporated in the chewing gum of the invention, with or without conventional preservatives.

The following represents preferred formulations of chewing gum in accordance with the present invention:

| Gum Base | |
|---|---|
| Ingredient | % by Weight of Gum Base |
| Polyisobutylene molecular weight - 950,000 1,050,000 [Flory] | 0 to 10 } total elastomers at least 4% |
| molecular weight - 37,000 46,000 [Flory] | 0 to 18 |
| Polyterpene resin | 4 to 20 |
| Microcrystalline wax | 0 to 15 } total waxes at least 2% |
| Paraffin wax | 0 to 15 |
| Polyethylene wax | 0.25 to 5 |
| Glyceryl triacetate | 1 to 8 |
| Acetylated monoglyceride | 1 to 10 |
| Glycerol monostearate | 2 to 8 |
| Hydrogenated soyabean flakes | 2 to 8 |
| Hydrogenated cottonseed oil flakes | 2 to 10 |
| Calcium carbonate | 15 to 35 |
| Polyvinyl acetate | 15 to 30 |

| Sugar Chewing Gum | |
|---|---|
| Ingredient | % by Weight of Gum Base |
| Gum base | 20 to 30 |
| Powdered sugar | 45 to 65 |
| Corn syrup | 15 to 30 |
| Lecithin | 0 to 0.5 |
| Flavor oil | 0.5 to 1.5 |
| Coloring | 0 to 0.5 |

| Sugarless Chewing Gum | |
|---|---|
| Ingredient | % by Weight of Gum Base |
| Gum base | 20 to 30 |
| Sorbitol | 45 to 65 |
| Hydrogenated starch hydrolysate | 10 to 22 |
| Lecithin | 0 to 0.75 |
| Flavor oil | 0.5 to 2 |
| Glyceride | 0 to 6 |

The chewing gum of the present invention may be formed using conventional processing techniques. For example, the polyisobutylene resins, waxes and polyterpene resin are mixed for 6 to 15 hours so that a substantially uniform mixture of polyisobutylene and polyterpene dissolved in the wax is formed without lumps. The remaining ingredients may then be added to the uniform paste with mixing to form the gum base of the invention.

However, a preferred method for forming the gum base in accordance with the present invention includes the steps of mixing the two types of polyisobutylenes together with the filler-texturizing agent, adding polyterpene resin to the mixture and mixing for about 0.5 to 4 hours and preferably mixing for 0.5 to 3 hours, and optimally for 0.5 to 1.5 hours to form a paste wherein the polyisobutylene are incorporated without leaving fish-eye type particles. The shearing action of the mixing blades on the filler breaks up the polyisobutylene resins into particles to form a uniform paste. Thereafter, the remaining ingredients including the anti-tack agent, polyvinyl acetate, microcrystalline wax, paraffin wax, glyceryl triacetate, acetylated monoglyceride, glyceryl monostearate, hydrogenated soyabean oil and hydrogenated cottonseed oil flakes are separately added with mixing to form the gum base of the invention.

The chewing gum of the invention may be formed by adding chewing gum ingredients to the gum base according to accepted conventional chewing gum making techniques.

The following Examples represent preferred embodiments of the present invention.

EXAMPLE 1

A non-tacky gum base of the following formulation is prepared as described below.

| Gum Base | Parts by Weight of the Gum Base |
|---|---|
| Polyisobutylene (M.W. 1,000,000) | 4 |
| Polyisobutylene (M.W. 50,000) | 6 |
| Polyvinyl acetate | 22 |
| Polyterpene (Piccolyte C-115-Hercules) | 7 |
| Polyethylene wax (M.W. 2000 melting point 254° F.) | 2 |
| Microcrystalline wax (melting point - 170° F.) | 2 |
| Paraffin wax | 7 |
| Glyceryl triacetate (triacetin) | 3 |
| Glyceryl monostearate | 2 |
| Acetylated monoglyceride | 4 |
| Hydrogenated soyabean flakes | 4 |
| Hydrogenated cottonseed oil flakes | 5 |
| Calcium carbonate | 32 |

The polyisobutylenes are added to a kettle-mixer and maintained under 60 lb. steam pressure for about 5 minutes. Thereafter, about 75% of the calcium carbonate and about 20% of the polyterpene resin are mixed in with the polyisobutylenes for about 70 minutes at which time a smooth uniform paste free of lumps is obtained. The remainder of the calcium carbonate and polyterpene resin are added with mixing for about 10 minutes. The polyethylene wax is then added in two portions with mixing for about 5 to 8 minutes with each portion. The polyvinyl acetate is then added in two portions with mixing for 7 minutes and 15 minutes, respectively. Thereafter, the microcrystalline wax and each of two portions of paraffin wax are added with mixing for 5, 5 and 10 minutes, respectively, under 60 lb. steam pressure. Next the glyceryl triacetate is slowly added with mixing for about 5 minutes, followed by the glyceryl monostearate and glyceryl monoacetate with mixing for about 5 minutes. The soyabean flakes and confectionery fat are separately added with mixing of about 5 and 10 minutes, respectively, to form the gum base of the invention.

EXAMPLE 2

A non-tacky chewing gum having the following formulation is prepared as described below.

| Chewing Gum | Parts by Weight of the Gum Base |
|---|---|
| Gum base (as described in Ex. 1) | 30.5 |
| Powdered sugar | 50 |
| 44° Corn syrup | 18 |
| Lecithin | 0.3 |
| Coloring | 0.2 |
| Flavor oil | 1 |

The gum base formed as described above is combined with chewing gum ingredients as set out in the above table to form a non-stick non-tack chewing gum in accordance with the present invention which remains soft over extended periods even without the presence of antioxidants. In addition, the gum base appears to extend sweetness and flavor of the chewing gum over substantially longer periods than previously thought possible.

EXAMPLE 3

A non-tacky bubble gum having the following composition is prepared as described below.

| Ingredient | Parts by Weight of the Gum Base |
|---|---|
| Gum base (as described in Ex. 1) | 22 |
| Sugar pulverized | 52 |
| Corn syrup 43° Be | 23 |
| Flavor | 1 |
| L.G. paste } softeners | 1 |
| Glycerine | 0.5 |
| Color | 0.05 |

The gum base is melted in a kettle at 150° F. and a small portion (10-15%) of the pulverized sugar and the corn syrup are added with mixing over a 5 minute period. Thereafter, the remaining ingredients are added according to conventional chewing gum practice to form a non-tacky chewing gum in accordance with the invention which has excellent softness and shelf-life even in the absence of antioxidants, and has extended flavor and sweetness.

EXAMPLE 4

A non-tacky bubble gum having the following composition is prepared as described below.

| Ingredient | Parts by Weight of the Gum Base |
|---|---|
| Gum base (as described in Ex. 1) | 24 |
| Sugar pulverized | 61 |
| High fructose corn syrup (42% fructose, 29% H$_2$O) | 14 |
| Flavor | 1 |

The gum base is melted in a kettle at 150° F. and a small portion (10-15%) of the pulverized sugar and the high fructose corn syrup are added with mixing over a 5 minute period. Thereafter, the remaining ingredients are added according to conventional chewing gum practice to form a non-tacky chewing gum in accordance with the invention which has excellent softness and shelf-life even in the absence of antioxidants, and has extended flavor and sweetness.

What is claimed is:

1. A chewing gum base which has excellent shelf-life and remains soft over extended periods of time, comprising a polyisobutylene elastomer or a mixture of medium and lower molecular weight polyisobutylene elastomers having a molecular weight within the range of from about 750,000 to 1,300,000, and 37,000 to 80,000, respectively, said polyisobutylene elastomer being present in said base in an amount of at least about 4%, plasticizers comprising glyceryl triacetate and acetylated monoglyceride, one or more hydrophilic-type detackifiers which absorb saliva and become slippery, one or more filler-texturizing agents, one or more softening agents having a melting point above about 22° C., one or more emulsifiers which function as slip agents and impart hydrophilic properties to the elastomer, and an anti-tack combination comprising a polyterpene resin in an amount of from about 4 to about 25% by weight of said gum base, one or more waxes in an amount of from at least 2% to about 25% by weight of said gum base to enhance bite through characteristics, and optionally a polyethylene wax.

2. The gum base as defined in claim 1 wherein said anti-tack combination comprises polyterpene resin, one or more waxes and a polyethylene wax.

3. The gum base as defined in claim 2 wherein said polyethylene wax is present in an amount of from about 0.25 to about 5% by weight of the gum base.

4. The gum base as defined in claim 1 wherein said waxes comprise microcrystalline wax, paraffin wax or mixtures thereof.

5. The gum base as defined in claim 1 wherein said medium molecular weight polyisobutylene is employed in a weight ratio to the lower molecular weight polyisobutylene of within the range of from about 1:1 to about 1:10.

6. The gum base as defined in claim 1 wherein said polyisobutylenes have molecular weights of 1,000,000 to 1,200,000 and 40,000 to 50,000, respectively.

7. The gum base as defined in claim 1 wherein plasticizers are employed in an amount within the range of from about 0.5 to about 25% by weight of the gum base.

8. The gum base as defined in claim 7 wherein said glyceryl triacetate is employed in an amount within the range of from about 0 to about 10% by weight of said gum base and said glyceryl monoacetate is employed in an amount within the range of from about 0 to about 15% by weight of said gum base.

9. The gum base as defined in claim 1 wherein the hydrophilic-type detackifier is employed in an amount within the range of from about 5 to about 60% by weight of the gum base.

10. The gum base as defined in claim 1 wherein said hydrophilic-type detackifier is polyvinyl acetate.

11. The gum base as defined in claim 1 wherein the filler-texturizing agent comprises calcium carbonate or talc employed in an amount within the range of from about 0 to about 60% by weight of the gum base.

12. The gum base as defined in claim 3 wherein the softening agent comprises hydrogenated vegetable or animal fats having a melting point above about 50° C. and is employed in an amount within the range of from about 0.5 to about 25% by weight of the gum base.

13. The gum base as defined in claim 12 wherein said softening agents comprise hydrogenated soyabean oil, confectionery fat, cocoa butter, hydrogenated cottonseed oil, corn oil, peanut oil, palm oil, tallow or lard.

14. The gum base as defined in claim 13 wherein said softening agent is hydrogenated soyabean oil, hydrogenated cottonseed oil, or mixtures thereof.

15. the gum base as defined in claim 1 wherein the emulsifier is employed in an amount within the range of from about 0.1 to about 10% by weight of the gum base.

16. The gum base as defined in claim 15 wherein the emulsifier is glyceryl monostearate.

17. The gum base as defined in claim 1 having the following composition:

| | Parts by Weight |
|---|---|
| Polyisobutylenes | |
| Molecular weight 1,000,000 to 1,300,000 | 2 to 10 |
| Molecular weight 40,000 to 50,000 | 2 to 18 |
| Polyvinyl acetate | 15 to 30 |
| Polyterpene resin | 4 to 20 |
| Polyethylene wax (melting point | |

-continued

|  | Parts by Weight |
|---|---|
| 170 to 300° F.) | 1 to 4 |
| Microcrystalline wax | 1 to 15 |
| Paraffin wax | 1 to 15 |
| Glyceryl triacetate | 1 to 8 |
| Glyceryl monostearate | 2 to 8 |
| Hydrogenated soyabean oil | 2 to 8 |
| Hydrogenated cottonseed oil flakes | 2 to 10 |
| Acetylated monoglyceride | 1 to 10 |
| Calcium carbonate | 15 to 35 |

18. A chewing gum containing gum base as defined in claim 1.

19. Chewing gum containing gum base as defined in claim 15.

20. The anti-tack chewing gum as defined in claim 19 containing sugar, non-sugar sweeteners or mixtures thereof.

21. The anti-tack chewing gum as defined in claim 19 comprising corn syrup, high fructose corn syrup, sugar, flavor and optionally glycerine.

22. A method for preparing the gum base as defined in claim 1 which comprises mixing the medium-high molecular weight polyisobutylene and the low molecular weight polyisobutylene with the filler-texturizer, adding the polyterpene resin and mixing to form a substantially uniform paste, and adding the remaining ingredients with mixing to form the gum base.

23. The method as defined in claim 22 wherein said filler-texturizing agent is calcium carbonate or talc.

24. The gum base as defined in claim 1 wherein the polyisobutylene elastomer comprises polyisobutylene having a molecular weight of from about 950,000 to about 1,050,000 and comprises from 0 to about 10% by weight of said gum base.

25. The gum base as defined in claim 1 wherein the polyisobutylene elastomer comprises polyisobutylene having a molecular weight of from about 37,000 to about 46,000 and comprises from 0 to about 18% by weight of said gum base.

* * * * *

REEXAMINATION CERTIFICATE (378th)

United States Patent [19]

Cherukuri et al.

[11] B1 4,352,822

[45] Certificate Issued Sep. 3, 1985

[54] GUM BASE, CHEWING GUM CONTAINING SAME AND METHOD

[75] Inventors: Subraman R. Cherukuri; Dominick R. Friello, both of Danbury, Conn.; Michael Ferroti, Larchmont, N.Y.; Walter Jewell, Mamaroneck, N.Y.; Ronald P. D'Amelia, Hicksville, N.Y.

[73] Assignee: Nabisco Brands Inc., New York, N.Y.

Reexamination Request:
No. 90/000,429, Aug. 8, 1983

Reexamination Certificate for:
Patent No.: 4,352,822
Issued: Oct. 5, 1982
Appl. No.: 216,415
Filed: Dec. 15, 1980

[51] Int. Cl.³ .............................................. A23G 3/30
[52] U.S. Cl. .......................................... 426/4; 426/3; 426/6
[58] Field of Search ................................ 426/3, 4, 5, 6

[56] References Cited
FOREIGN PATENT DOCUMENTS
088096 4/1974 Japan .

*Primary Examiner*—Jeanette M. Hunter

[57] ABSTRACT

A synthetic non-styrene-butadiene rubber gum base is provided which has non-stick properties, retains its softness over extended periods of time even without the presence of antioxidants and improves or extends sweetness and flavor when used in either sugar or sugarless chewing gum and contains polyisobutylene and a mixture of polyvinyl acetate, triacetin and glyceryl monostearate as film forming-plasticizing agents together with polyterpene, polyethylene, wax, glyceryl monostearate, fatty acid esters and filler. A chewing gum containing this gum base and method for preparing same are also provided.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1 line 49 to Column 2, line 8:

In accordance with the present invention, a non-styrene-butadiene rubber (SBR) gum base is provided which contains a unique combination of plasticizers and waxes and has the unique properties of improving or extending sweetness and/or flavor in both sugar and sugarless chewing gums, retaining its softness over extended periods of time even without the presence of antioxidants and in preferred embodiments is non-sticky even though waxes are present. These outstanding features are attained by employing as the elastomer in the gum base of the invention a mixture of polyisobutylene of medium molecular weight (750,000 to 1,300,000 [Floryl]), and lower molecular weight (37,000 to 80,000 [Floryl]) together with a unique combination of plasticizers including glyceryl triacetate and acetylated monoglycerides together with a hydrophilic type detackifier, such as polyvinyl acetate and a combination of ingredients to impart non-stick properties which include polyterpene resin (which also serves as a film-former to aid in blowing bubbles), one or more hard waxes to enhance slip and bite through characteristics and optionally polyethylene wax to impart non-tack properties. In addition, the unique gum base of the invention will contain an emulsifier, such as glyceryl monostearate, optionally hydrogenated or partially hydrogenated fatty acid esters of vegetable or animal origin to impart softening and plasticity, and one or more fillers-texturizing agents.

Column 2 lines 35-44:

The mixture of glyceryl triacetate and [glyceryl monoacetate] *acetylated monoglycerides* plasticizers are essential to the gum base of the invention for imparting softness and plasticization to the gum base. The glyceryl triacetate will be present in an amount of within the range of from about 0 to about 10%, and preferably from about 1 to about 8% by weight of the gum base, while the acetylated monoglyceride will be present in an amount of within the range of from about 0 to about 15%, and preferably from about 1 to about 10% by weight of the gum base.

Column 6 lines 25-47:

The polyisobutylenes are added to a kettle-mixer and maintained under 60 lb. steam pressure for about 5 minutes. Thereafter, about 75% of the calcium carbonate and about 20% of the polyterpene resin are mixed in with the polyisobutylenes for about 70 minutes at which time a smooth uniform paste free of lumps is obtained. The remainder of the calcium carbonate and polyterpene resin are added with mixing for about 10 minutes. The polyethylene wax is then added in two portions with mixing for about 5 to 8 minutes with each portion. The polyvinyl acetate is then added in two portions with mixing for 7 minutes and 15 minutes, respectively. Thereafter, the microcrystalline wax and each of two portions of paraffin wax are added with mixing for 5, 5 and 10 minutes, respectively, under 60 lb. steam pressure. Next the glyceryl triacetate is slowly added with mixing for about 5 minutes, followed by the glyceryl monostearate and [glyceryl monoacetate] *acetylated monoglyceride* with mixing for about 5 minutes. The soybean flakes and confectionary fat are separately added with mixing of about 5 and 10 minutes, respectively, to form the gum base of the invention.

AS A RESULT OF REEXAMINATION, IT HAS BEEN DETERMINED THAT:

Claims 2, 9 and 10 are cancelled.

Claims 1, 3, 8, 15 and 17 are determined to be patentable as amended.

Claims 4-7, 11-14, 16 and 18-25, dependent on an amended claim, are determined to be patentable.

New claims 26-28 are added and determined to be patentable.

1. A chewing gum base which has excellent shelf-life and remains soft over extended periods of time, comprising a polyisobutylene elastomer or a mixture of medium and lower molecular weight polyisobutylene elastomers having a molecular weight within the range of from about 750,000 to 1,300,000, and 37,000 to 80,000, respectively, said polyisobutylene elastomer being present in said base in an amount of at least about 4%, plasticizers comprising *at least one of* glyceryl triacetate *in an amount of from about 0 to about 10% by weight of said gum base* and acetylated monoglyceride *in an amount of from about 0 to about 15% by weight of said gum base*, one or more hydrophilic-type detackifiers *comprising polyvinyl acetate in an amount of from about 10 to about 45% by weight of said gum base*, which absorb saliva and become slippery, one or more filler-texturizing agents, one or more softening agents having a melting point above about 22° C., one or more emulsifiers which function as slip agents and impart hydrophilic properties to the elastomer, and an anti-tack combination comprising a polyterpene resin in an amount of from about 4 to about 25% by weight of said gum base, one or more waxes in an amount of from at least 2% to about 25% by weight of said gum base to enhance bite through characteristics, and optionally a polyethylene wax.

3. The gum base as defined in claim *1* [2] wherein said polyethylene wax is present in an amount of from about 0.25 to about 5% by weight of said gum base.

8. [The] *A chewing* gum base as defined in claim 7 wherein said [glyceryl triacetate is employed in an amount within the range of from about 0 to about 10% by weight of said gum base and] *plasticizers consist essentially of* said [glyceryl monoacetate] *acetylated monoglyceride* [is employed in an amount within the range of from about 0 to about 15% of said base].

15. [t] The gum base as defined in claim 1 wherein the emulsifier is employed in an amount within the range of from about 0.1 to about 10% by weight of the gum base.

17. The gum base as defined in claim 1 having *good bubble-blowing properties and non-tacky chew characteristics, having* the following composition:

|  | Parts by Weight |
|---|---|
| Polyisobutylenes |  |
| Molecular weight 1,000,000 to 1,300,000 | 2 to 10 |
| Molecular weight 40,000 to 50,000 | 2 to 18 |
| Polyvinyl acetate | 15 to 30 |
| Polyterpene resin | 4 to 20 |
| Polyethylene wax (melting point 170 to 300° F.) | 1 to 4 |
| Microcrystalline wax | 1 to 15 |
| Paraffin wax | 1 to 15 |
| Glyceryl triacetate | 1 to 8 |
| Glyceryl monostearate | 2 to 8 |
| Hydrogenated soyabean oil | 2 to 8 |
| Hydrogenated cottonseed oil flakes | 2 to 10 |
| Acetylated monoglyceride | 1 to 10 |
| Calcium carbonate | 15 to 35 |

26. A bubble gum base which has non-tacky chew characteristics, has excellent shelf-life and remains soft over extended periods of time, comprising a polyisobutylene elastomer or a mixture of medium and lower molecular weight polyisobutylene elastomers having a molecular weight within the range of from about 750,000 to 1,300,000, and 37,000 to 80,000, respectively, said polyisobutylene elastomer being present in said base in an amount of at least about 4%, plasticizers comprising from about 1 to about 3% glyceryl triacetate from 1 to 15% acetylated monoglyceride by weight of said gum base, one or more hydrophilic-type detackifiers which absorb saliva and become slippery and comprise polyvinyl acetate in an amount of from about 10 to about 45% by weight of said gum base, one or more filler-texturizing agents, one or more softening agents having a melting point above about 22° C., one or more emulsifiers which function as slip agents and impart hydrophilic properties to the elastomer, and an anti-tack combination comprising a polyterpene resin an an amount of from about 4 to about 25% by weight of said gum base, one or more waxes in an amount of from at least 2% to about 25% by weight of said gum base to enhance bite through characteristics, and optionally a polyethylene wax.

27. A bubble gum base which has non-tacky chew characteristics and excellent shelf-life and remains soft over extended periods of time, comprising a polyisobutylene elastomer or a mixture of medium and lower molecular weight polyisobutylene elastomers having a molecular weight within the range of from about 750,000 to 1,300,000, and 37,000 to 80,000, respectively, said polyisobutylene elastomer being present in said base in an amount of from about 10% to about 16%, plasticizers comprising from 1 to about 3% glyceryl triacetate and from about 1 to about 8% acetylated monoglyceride, from about 15 to about 30% by weight of said gum base of polyvinyl acetate, one or more filler-texturizing agents, one or more softening agents having a melting point above about 22° C., one or more emulsifiers which function as slip agents and impart hydrophilic properties to the elastomer, and an anti-tack combination comprising a polyterpene resin in an amount of from about 4 to about 25% by weight of said gum base, one or more waxes in an amount of from at least 2% to about 25% by weight of said gum base to enhance bite through characteristics, and optionally a polyethylene wax.

28. A chewing gum base which is non-tacky and has excellent shelf-life and remains soft over extended periods of time, comprising a polyisobutylene elastomer or a mixture of medium and lower molecular weight polyisobutylene elastomers having a molecular weight within the range of from about 750,000 to 1,300,000, and 37,000 to 80,000, respectively, said polyisobutylene elastomer being present in said base in an amount of at least 4%, plasticizers consisting essentially of acetylated monoglyceride, from about 15 to about 30% polyvinyl acetate based upon the weight of said gum base, one or more filler-texturizing agents, one or more softening agents having a melting point above about 22° C., one or more emulsifiers which function as slip agents and impart hydrophilic properties to the elastomer, and an anti-tack combination comprising a polyterpene resin in an amount of from about 4 to about 25% by weight of said gum base, one or more waxes in an amount of from at least 2% to about 25% by weight of said gum base to enhance bite through characteristics, and optionally a polyethylene wax.

* * * * *